(12) United States Patent
Iwasaki et al.

(10) Patent No.: US 10,184,556 B2
(45) Date of Patent: Jan. 22, 2019

(54) BRAKE DEVICE OF TRANSMISSION

(71) Applicant: MAZDA MOTOR CORPORATION, Aki-gun, Hiroshima (JP)

(72) Inventors: Tatsuhiko Iwasaki, Hiroshima (JP); Shinya Kamada, Kure (JP); Tatsutoshi Mizobe, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 15/514,445

(22) PCT Filed: Oct. 14, 2015

(86) PCT No.: PCT/JP2015/005199
§ 371 (c)(1),
(2) Date: Mar. 24, 2017

(87) PCT Pub. No.: WO2016/067538
PCT Pub. Date: May 6, 2016

(65) Prior Publication Data
US 2017/0276235 A1 Sep. 28, 2017

(30) Foreign Application Priority Data
Oct. 30, 2014 (JP) .................................. 2014-221367

(51) Int. Cl.
*F16D 65/853* (2006.01)
*F16H 57/10* (2006.01)
(Continued)

(52) U.S. Cl.
CPC ......... *F16H 57/10* (2013.01); *F16D 25/0638* (2013.01); *F16D 55/40* (2013.01);
(Continued)

(58) Field of Classification Search
CPC .......... F16D 55/36; F16D 55/40; F16D 55/44; F16H 57/10; F16H 57/0473; F16H 57/0424; F16H 2063/303
See application file for complete search history.

(56) References Cited

U.S. PATENT DOCUMENTS

| | | | | | |
|---|---|---|---|---|---|
| 4,562,902 A | * | 1/1986 | Scibbe | .................... | B60T 1/062 188/106 P |
| 6,543,222 B1 | * | 4/2003 | Case | ...................... | B60T 1/065 188/264 F |

(Continued)

FOREIGN PATENT DOCUMENTS

| | | |
|---|---|---|
| JP | 50125174 A | 10/1975 |
| JP | 62012029 U1 | 1/1987 |

(Continued)

OTHER PUBLICATIONS

ISA Japan Patent Office, International Search Report Issued in Application No. PCT/JP2015/005199, dated Jan. 19, 2016, WIPO, 1 page.

(Continued)

*Primary Examiner* — Nicholas J Lane
(74) *Attorney, Agent, or Firm* — Alleman Hall Creasman & Tuttle LLP

(57) ABSTRACT

A brake device of a transmission according to the present invention includes: a rotary-side holding member including an inner peripheral surface having a cylindrical surface shape about an axis extending in a forward/rearward direction and configured to hold a rotary-side friction plate on the inner peripheral surface; a fixed-side holding member including an outer peripheral surface having a cylindrical surface shape about the axis extending in the forward/rearward direction and configured to hold a fixed-side friction plate on the outer peripheral surface; and a lubricating oil supply portion supplying lubricating oil to the fixed-side (Continued)

friction plate and the rotary-side friction plate. The fixed-side holding member is provided in a transmission casing so as not to rotate. The rotary-side holding member is provided in the transmission casing at a radially outer side of the fixed-side holding member and is rotatable about a central axis of the inner peripheral surface.

9 Claims, 11 Drawing Sheets

(51) Int. Cl.
| | |
|---|---|
| *F16D 25/0638* | (2006.01) |
| *F16D 55/40* | (2006.01) |
| *F16D 65/12* | (2006.01) |
| *F16D 67/04* | (2006.01) |
| *F16H 57/04* | (2010.01) |
| *F16H 63/30* | (2006.01) |
| *F16D 121/04* | (2012.01) |
| *F16D 25/12* | (2006.01) |

(52) U.S. Cl.
CPC ......... *F16D 65/122* (2013.01); *F16D 65/853* (2013.01); *F16D 67/04* (2013.01); *F16H 57/0409* (2013.01); *F16H 57/0427* (2013.01); *F16H 57/0473* (2013.01); *F16H 63/3026* (2013.01); *F16D 25/123* (2013.01); *F16D 2121/04* (2013.01); *F16H 57/0424* (2013.01); *F16H 2063/303* (2013.01); *F16H 2200/0052* (2013.01); *F16H 2200/201* (2013.01); *F16H 2200/2043* (2013.01)

(56) References Cited

U.S. PATENT DOCUMENTS

| | | |
|---|---|---|
| 2006/0260899 A1 | 11/2006 | Sawayanagi |
| 2012/0234121 A1* | 9/2012 | Jensen .................... B60T 1/062 74/411.5 |
| 2013/0186714 A1 | 7/2013 | Hoots et al. |
| 2017/0009831 A1* | 1/2017 | Iwasaki ................... B60T 1/062 |

FOREIGN PATENT DOCUMENTS

| | | |
|---|---|---|
| JP | 03004938 U1 | 1/1991 |
| JP | 2002054653 A | 2/2002 |
| JP | 2004278562 A | 10/2004 |
| JP | 2006322554 A | 11/2006 |
| JP | 2006342819 A | 12/2006 |
| JP | 2009236234 A | 10/2009 |
| JP | 2015504150 A | 2/2015 |

OTHER PUBLICATIONS

ISA Japan Patent Office, Written Opinion Issued in Application No. PCT/JP2015/005199, dated Jan. 19, 2016, WIPO, 5 pages.

* cited by examiner

|  | LOW CLUTCH (40) | HIGH CLUTCH (50) | LR BRAKE (60) | 2-6 BRAKE (70) | R-3-5 BRAKE (80) |
|---|---|---|---|---|---|
| FIRST GEAR STAGE | ENGAGED |  | ENGAGED |  |  |
| SECOND GEAR STAGE | ENGAGED |  |  | ENGAGED |  |
| THIRD GEAR STAGE | ENGAGED |  |  |  | ENGAGED |
| FOURTH GEAR STAGE | ENGAGED | ENGAGED |  |  |  |
| FIFTH GEAR STAGE |  | ENGAGED |  |  | ENGAGED |
| SIXTH GEAR STAGE |  | ENGAGED |  | ENGAGED |  |
| REVERSE GEAR STAGE |  |  | ENGAGED |  | ENGAGED |

BRAKE DEVICE OF TRANSMISSION

TECHNICAL FIELD

The present invention relates to a brake device of a transmission mounted on a vehicle.

BACKGROUND ART

Regarding a transmission such as an automatic transmission mounted on a vehicle, studies have been made to (i) realize a weight reduction by omitting a torque converter in such a manner that when starting the vehicle, a start brake (so-called low reverse brake) constituting part of the transmission is caused to slip to realize smooth start while avoiding engine stall; and (ii) improve fuel efficiency of the engine in such a manner that a lockup clutch is engaged when starting the vehicle.

Specifically, the start brake includes: rotary-side friction plates attached to a predetermined rotating body and configured to rotate integrally with the rotating body; and fixed-side friction plates opposed to the rotary-side friction plates and configured not to rotate. By the engagement and disengagement of these friction plates, a connection status between a start gear and a driving source such as an engine is changed. Realizing the above smooth start by causing these friction plates to slip when starting the vehicle has been studied.

In a case where the brake is caused to slip when starting the vehicle, the number of times of the slip of the start brake becomes large. Therefore, to prevent the brake from increasing in temperature, the brake needs to be effectively cooled. According to a conventional brake described in, for example, PTL 1, lubricating oil is supplied to the friction plates during slipping.

CITATION LIST

Patent Literature

PTL 1: Japanese Laid-Open Patent Application Publication No. 2009-236234

SUMMARY OF INVENTION

Technical Problem

According to the conventional brake described in, for example, PTL 1, the fixed-side friction plates are fixed to an inner peripheral surface of a casing of the transmission so as not to rotate, the casing accommodating the brake and the like, and the rotary-side friction plates and the rotating body holding the rotary-side friction plates are arranged at a radially inner side of the fixed-side friction plates. Therefore, there is a problem that: the lubricating oil supplied during slipping and the like stays on the inner peripheral surface of the casing, that is, stays in the vicinity of the fixed-side friction plates; and even when the fixed-side friction plates and the rotary-side friction plates are completely disengaged, this lubricating oil causes drag resistance among the friction plates to increase rotational resistance.

The present invention was made under the above circumstances and provides a brake device of a transmission, the brake device being able to prevent a case where lubricating oil causes drag resistance among friction plates to increase rotational resistance.

Solution to Problem

In order to solve the above problem, the present invention provides a brake device accommodated in a transmission casing, the brake device including: a rotary-side friction plate coupled to a predetermined rotary element; a rotary-side holding member configured to hold the rotary-side friction plate and be rotatable; a fixed-side friction plate arranged so as to be opposed to the rotary-side friction plate in a forward/rearward direction and configured to be engaged with and disengaged from the rotary-side friction plate; a rotary-side holding member configured to hold the fixed-side friction plate and not to rotate; and a lubricating oil supply portion configured to supply lubricating oil to the fixed-side friction plate and the rotary-side friction plate, wherein: the rotary-side holding member includes an inner peripheral surface located at a radially outer side of the fixed-side holding member; and the rotary-side friction plate is attached to the inner peripheral surface of the rotary-side holding member.

According to the above device, during slipping, the fixed-side friction plate and the rotary-side friction plate are effectively cooled by the lubricating oil supplied from the lubricating oil supply portion. Further, during a time other than during slipping, that is, when the lubricating oil is unnecessary, the lubricating oil is prevented from staying in the vicinity of the friction plate. With this, generation of drag resistance and an increase in rotational resistance at the friction plates by the staying of the lubricating oil can be suppressed, and this can improve the fuel efficiency. Specifically, according to this device, the rotary-side holding member configured to hold the rotary-side friction plate is arranged at a radially outer side of the fixed-side holding member configured to hold the fixed-side friction plate, and the rotary-side holding member rotates outside the fixed-side holding member. Therefore, by the centrifugal force generated by the rotation of the rotary-side holding member, the lubricating oil supplied to the friction plates can be quickly blown off to an outside of the inner peripheral surface of the rotary-side holding member, that is, to positions away from the friction plates. Thus, the lubricating oil can be prevented from staying in the vicinity of the friction plates.

In the present invention, it is preferable that the lubricating oil supply portion include a lubricating oil introducing portion which extends from an inner peripheral surface of the transmission casing toward the fixed-side holding member, that is, toward a radially inner side, and introduces the lubricating oil to the fixed-side holding member from an outside of the transmission casing.

With this, by the centrifugal force of the rotary-side holding member and the rotary-side friction plate, the lubricating oil can be moved from the fixed-side holding member toward the radially outer side to contact the entire fixed-side friction plate and the entire rotary-side friction plate. Thus, the friction plates can be effectively cooled.

In the present invention, it is preferable that the brake device further include: a retaining member arranged so as to be opposed to the friction plates; and a piston configured to push the friction plates toward the retaining member, wherein: the retaining member extend toward the radially outer side from a portion of the fixed-side holding member, the portion being located at a rear side of the friction plates; and the piston be provided in front of the friction plates.

With this, the lubricating oil supplied from the lubricating oil supply portion can be accumulated between the retaining member and the piston. Therefore, as described above, during a time other than during slipping, that is, when the lubricating oil is unnecessary, the lubricating oil is prevented from staying in the vicinity of the friction plate, and this reduces the rotational resistance. Further, during slipping and the like, the lubricating oil supplied is prevented from being excessively discharged to the outside from the vicinity of the friction plates. Thus, the friction plates can be more surely cooled.

In the present invention, it is preferable that the rotary-side holding member include a rotary-side groove portion which is a groove formed on the inner peripheral surface of the rotary-side holding member to extend in the forward/rearward direction and into which a radially outer end of the rotary-side friction plate is inserted; and the brake device further include an extending portion extending toward a radially inner side from a portion of the rotary-side holding member, the portion being located at a rear side of the rotary-side groove portion and a dam member provided at a front end of the rotary-side holding member and having a shape that covers at least part of the rotary-side groove portion when viewed from above.

With this, during slipping and the like, the lubricating oil can be prevented by the extending portion and the dam member from being excessively discharged to the outside from both rotation axis direction end portions of the rotary-side groove portion. Thus, the friction plates can be more surely cooled.

In the present invention, it is preferable that: the fixed-side holding member include a plurality of fixed-side groove portions formed at a plurality of respective circumferential direction positions on an outer peripheral surface of the fixed-side holding member and extending in the forward/rearward direction; a radially inner end of the fixed-side friction plate be inserted into part of the plurality of fixed-side groove portions; at least part of the remaining fixed-side groove portions be open toward the radially outer side over the forward/rearward direction; and the lubricating oil supply portion supply the lubricating oil to the open fixed-side groove portion.

With this, by especially the fixed-side groove portions that are open toward the radially outer side among the fixed-side groove portions, the lubricating oil can be supplied to a wide range in the rotation axis direction of the fixed-side holding member. Therefore, a contact area between the lubricating oil and each friction plate is increased, so that the friction plates can be effectively cooled.

DESCRIPTION OF EMBODIMENTS

Hereinafter, a brake device of a transmission according to Embodiment 1 of the present invention will be explained in reference to the drawings. The following will explain a case where the brake device is applied to an automatic transmission 1 shown in FIG. 12.

(1) Entire Configuration of Automatic Transmission 1

Figures 12, 13:
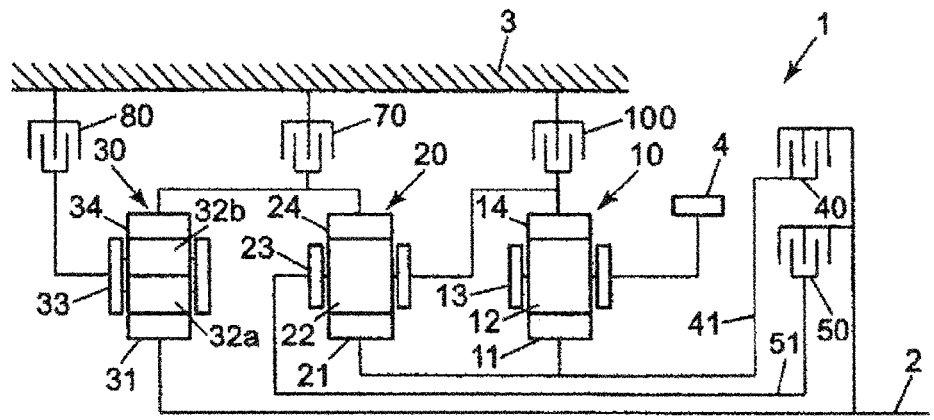
FIG. 12 is a schematic diagram of an automatic transmission according to an embodiment of the present invention.
FIG. 13 is a table showing relations among combinations of engagements of friction engaging elements and gear stages.

FIG. 12 is a schematic diagram showing the configuration of the automatic transmission 1. The automatic transmission 1 includes: an input shaft 2 to which an engine output that is a driving source is input; a plurality of planetary gear sets (hereinafter simply referred to as "gear sets") provided on the input shaft 2; a plurality of clutches connected to the input shaft 2; a plurality of brake devices connected to the gear sets (rotary elements of the gear sets), respectively; and an output gear 4.

In the present embodiment, as shown in FIG. 12, first, second, and third gear sets 10, 20, and 30 are arranged in this order from the engine side (from a right side in FIG. 12). As the clutches, a low clutch 40 and a high clutch 50 are provided. As the brake devices, a first-gear reverse-gear brake (LR (low reverse) brake; hereinafter referred to as a LR brake) 100, a second-gear sixth-gear brake (2-6 brake; hereinafter referred to as a 2-6 brake) 70, and a reverse-gear third-gear fifth-gear brake (R-3-5 brake; hereinafter referred to as an R-3-5 brake) 80 are provided.

The output gear 4 outputs the engine output to driving wheels (not shown).

The clutches 40 and 50 and the brake devices 100, 70, and 80 switch the gear sets 10, 20, and 30 through each of which the engine output transmitted through the input shaft 2 is transmitted to the output gear 4.

Each of the clutches 40 and 50 includes: an input side element coupled to the input shaft 2; and an output side element coupled to the gear set 10 or 20, and performs the engagement and disengagement of these elements.

Each of the brake devices 100, 70, and 80 includes: a rotary-side element coupled to a predetermined rotary element of the gear set (10, 20, 30); and a fixed-side element accommodated in a transmission casing 3 so as not to rotate, and performs the engagement and disengagement of these elements.

Each of the first gear set 10 and the second gear set 20 is a single pinion type gear set and includes: a sun gear (11, 21); a plurality of pinions (12, 22) which mesh with the sun gear (11, 21); a carrier (13, 23) which supports the pinions (12, 22); and a ring gear (14, 24) which meshes with the pinions (12, 22). The third gear set 30 is a double pinion type gear set and includes: a sun gear 31; a plurality of first pinions 32*a* which mesh with the sun gear 31; a second pinion 32*b* which meshes with the first pinions 32*a*; a carrier 33 which supports the pinions 32a and 32b; and a ring gear 34 which meshes with the second pinion 32b.

The sun gear 31 of the third gear set 30 is directly coupled to the input shaft 2. The sun gear 11 of the first gear set 10 and the sun gear 21 of the second gear set 20 are joined to each other to be coupled to an output member 41 of the low clutch 40. The carrier 23 of the second gear set 20 is coupled to an output member 51 of the high clutch 50.

The ring gear 14 of the first gear set 10 and the carrier 23 of the second gear set 20 are joined to each other to be coupled to the LR brake 100 (the rotary-side element of the LR brake 100). The ring gear 24 of the second gear set 20 and the ring gear 34 of the third gear set 30 are joined to each other to be coupled to the 2-6 brake 70 (the rotary-side element of the 2-6 brake 70). The carrier 33 of the third gear set 30 is coupled to the R-3-5 brake 80 (the rotary-side element of the R-3-5 brake 80). The carrier 13 of the first gear set 10 is coupled to the output gear 4.

In the automatic transmission 1 configured as above, as shown in FIG. 13, first to sixth gear stages and a reverse gear stage are switched by the low clutch 40, the high clutch 50, the LR brake 100, the 2-6 brake 70, and the R-3-5 brake 80. In FIG. 13, "Engaged" denotes a state where the clutch or the brake is in an engaged state, that is, a state where the input side element and output side element of the clutch are in the engaged state, or the rotary-side element and fixed-side element of the brake is in the engaged state.

The LR brake 100 connected to the first gear set 10 in the present embodiment corresponds to the brake device according to the present invention. Hereinafter, the L-R brake 100 is simply referred to as a brake device 100, and the structure of the brake device 100 will be explained.

(2) Entire Configuration of Brake Device 100

Figure 1:
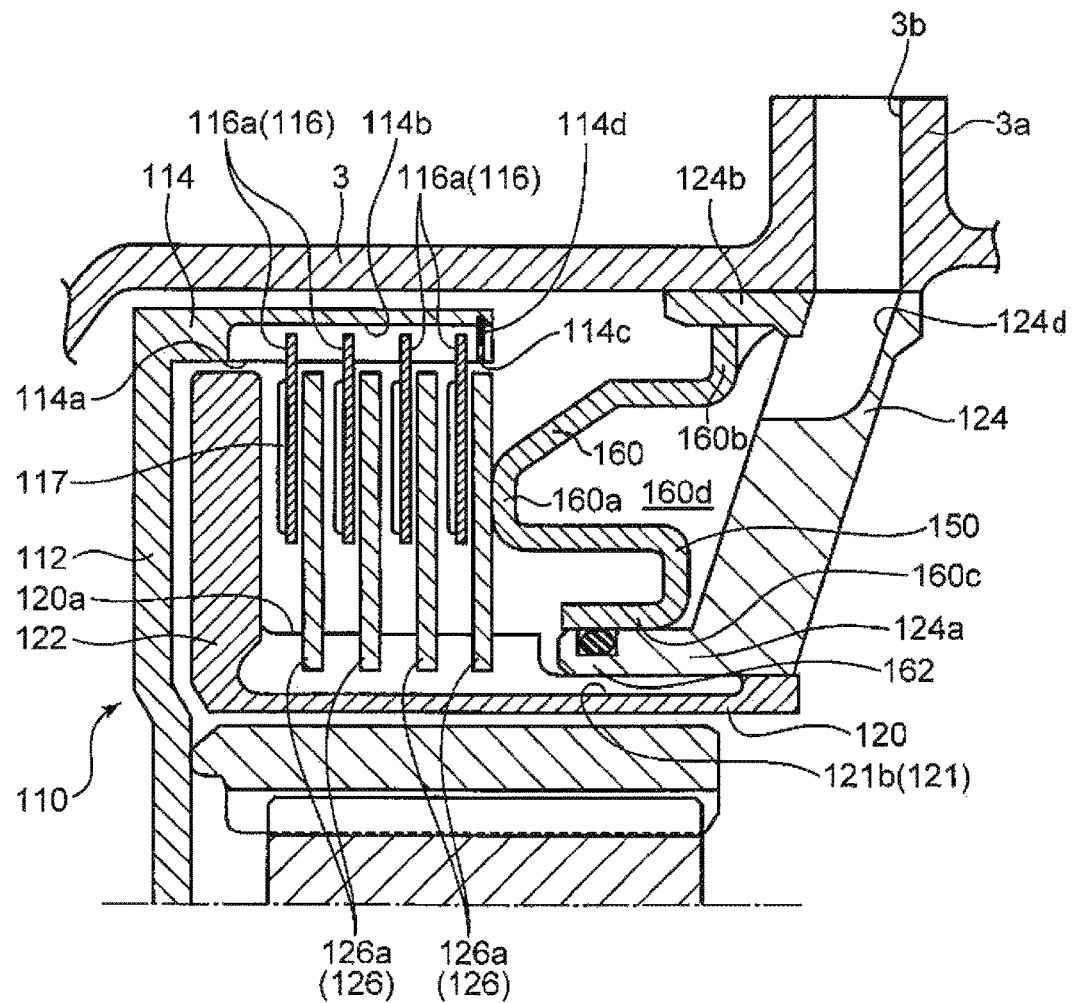
FIG. 1 is a partially enlarged view of a sectional view of a brake device according to Embodiment 1 of the present invention.
Figure 2:
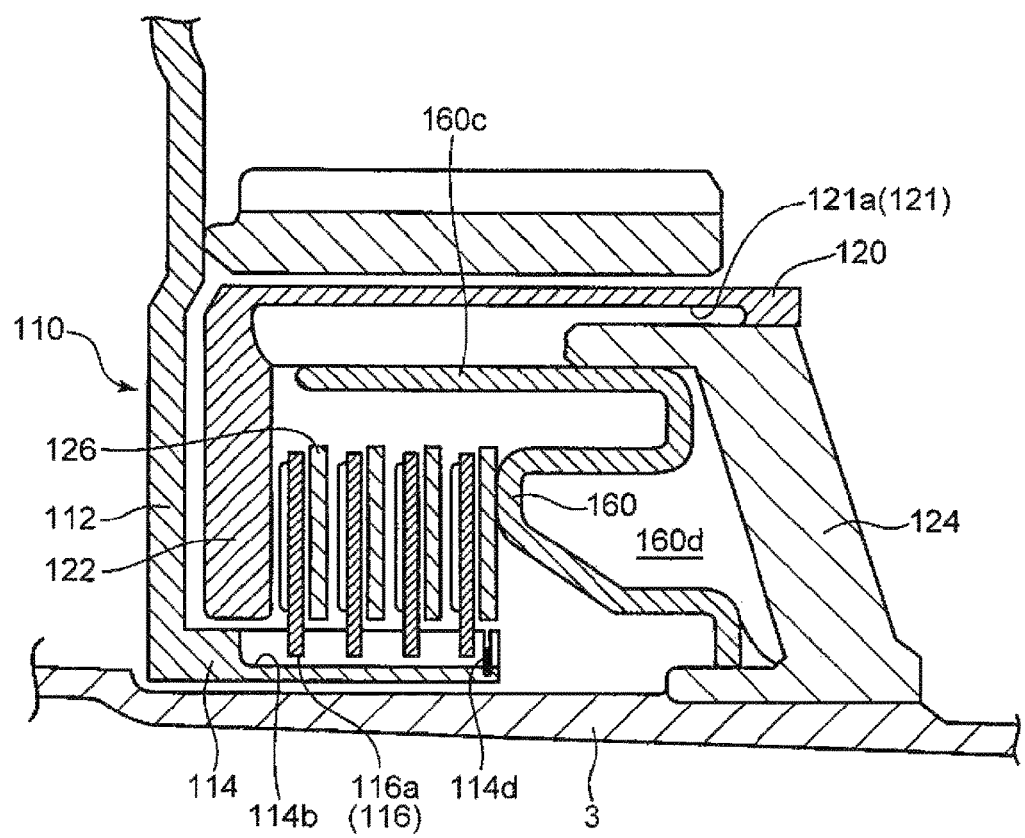
FIG. 2 is a partially enlarged view of the sectional view of the brake device according to Embodiment 1 of the present invention.
Figure 3:
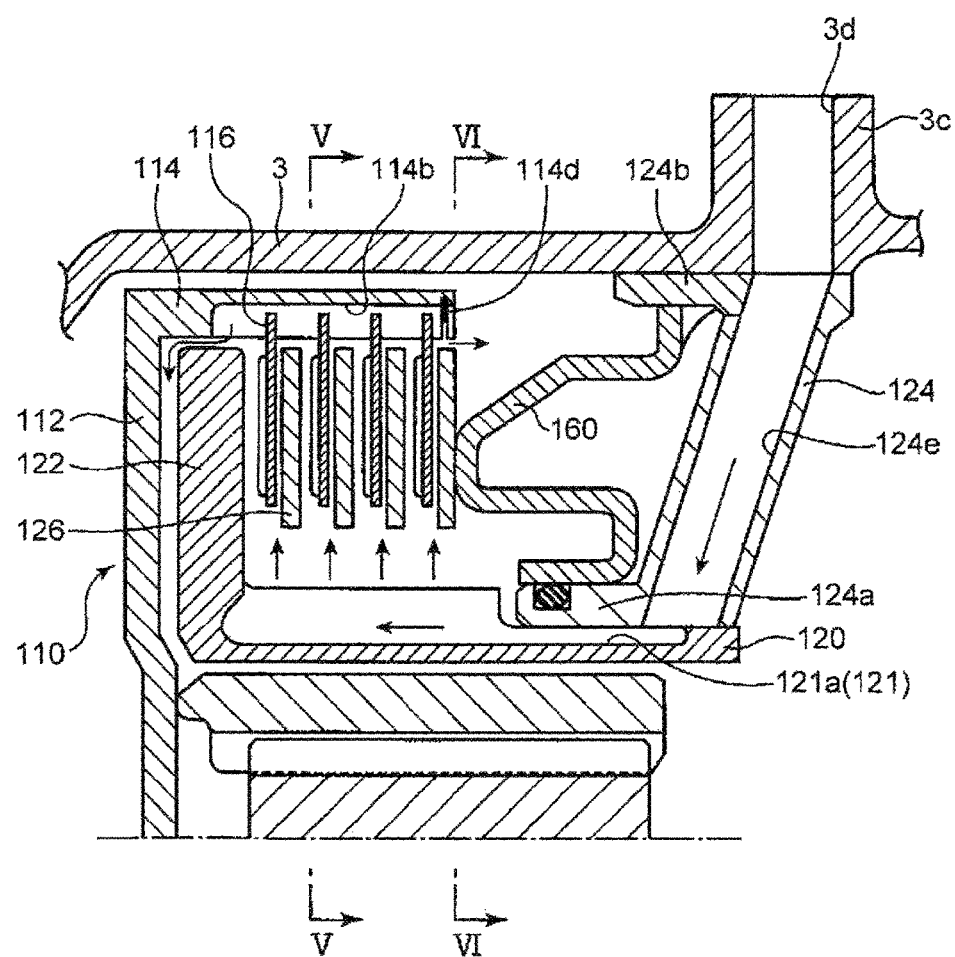
FIG. 3 is a partially enlarged view of a different sectional view of the brake device according to Embodiment 1 of the present invention.
Figure 4:
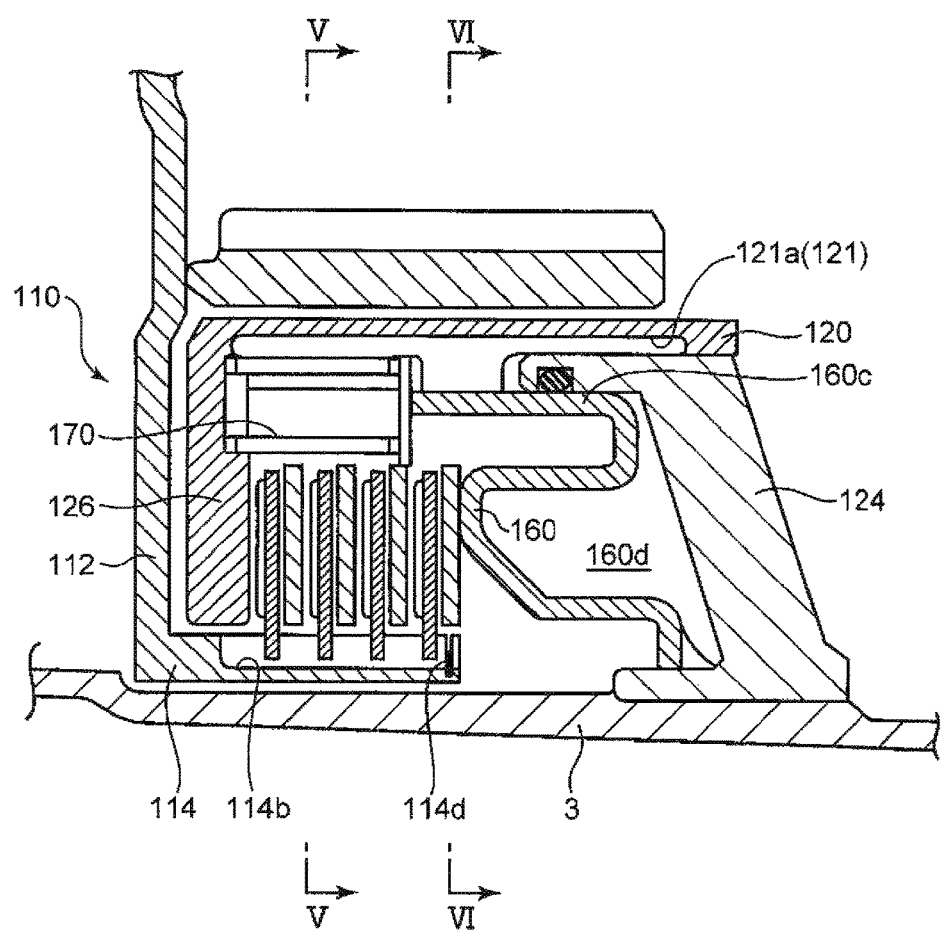
FIG. 4 is a partially enlarged view of the different sectional view of the brake device according to Embodiment 1 of the present invention.
Figure 5:
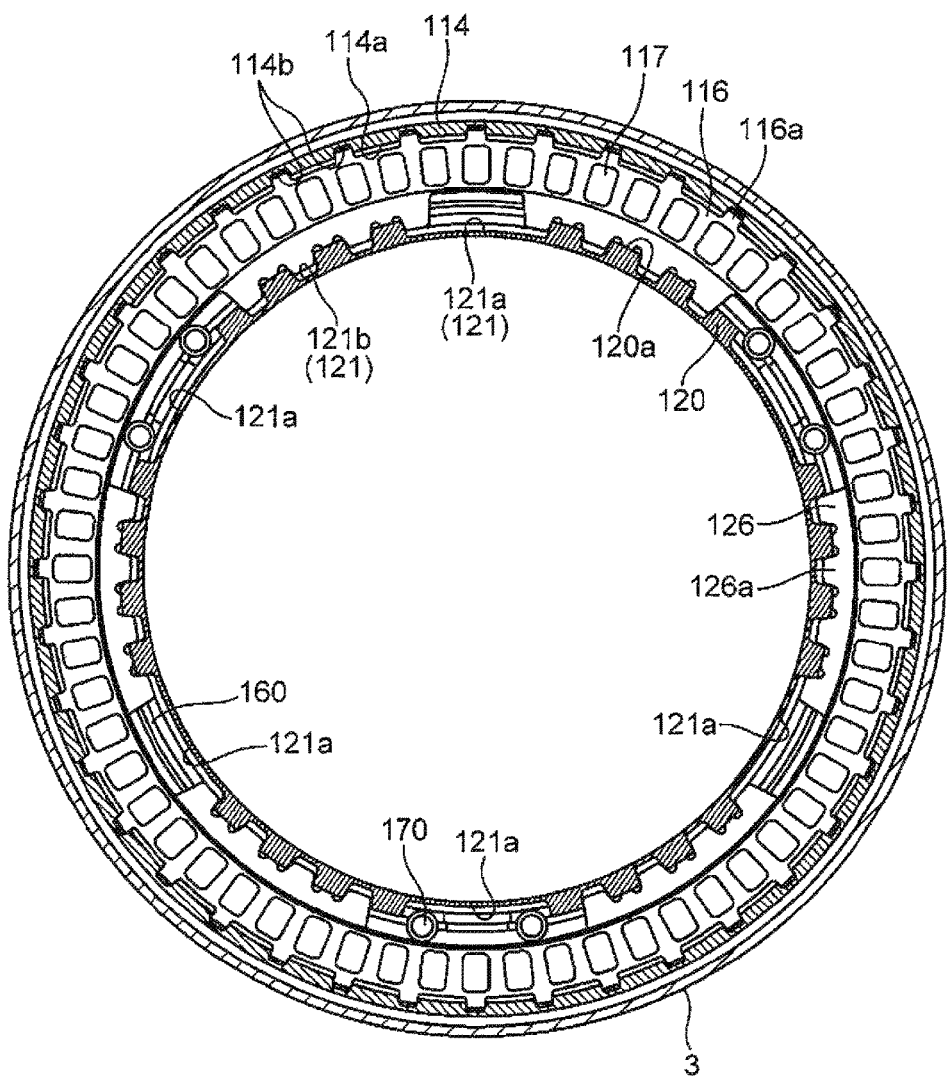
FIG. 5 is a sectional view taken along line V-V of FIGS. 3 and 4.
Figure 6:
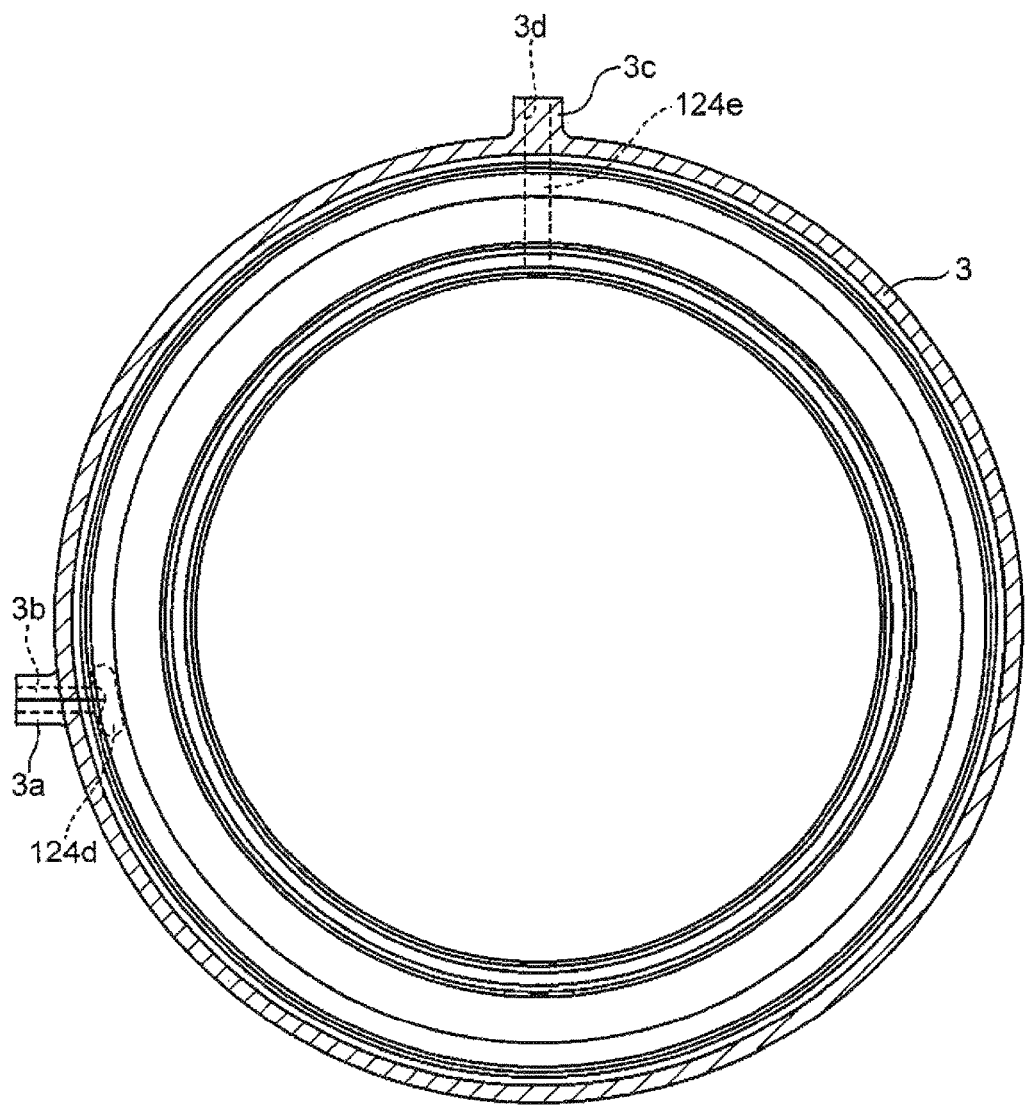
FIG. 6 is a sectional view taken along line VI-VI of FIGS. 3 and 4.
Figure 7:
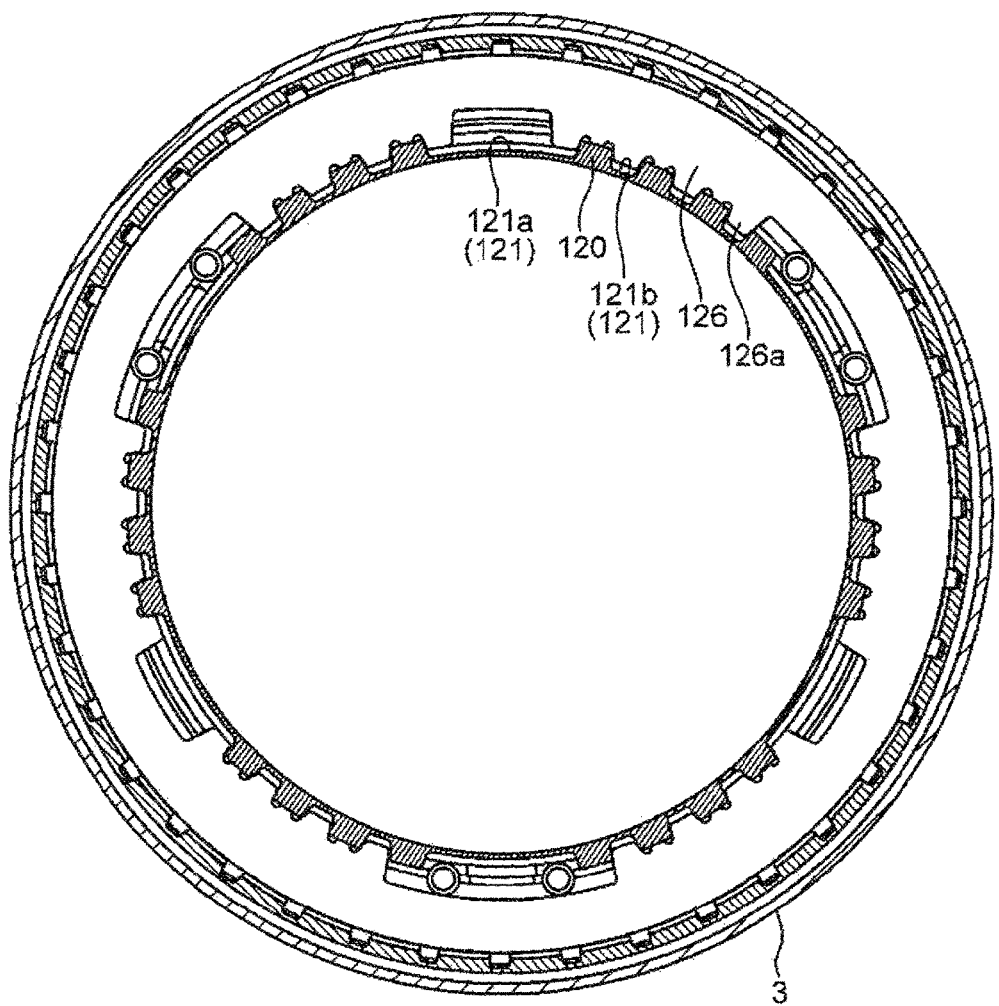
FIG. 7 is a diagram prepared by removing a rotary-side plate from FIG. 5.
Figure 8:
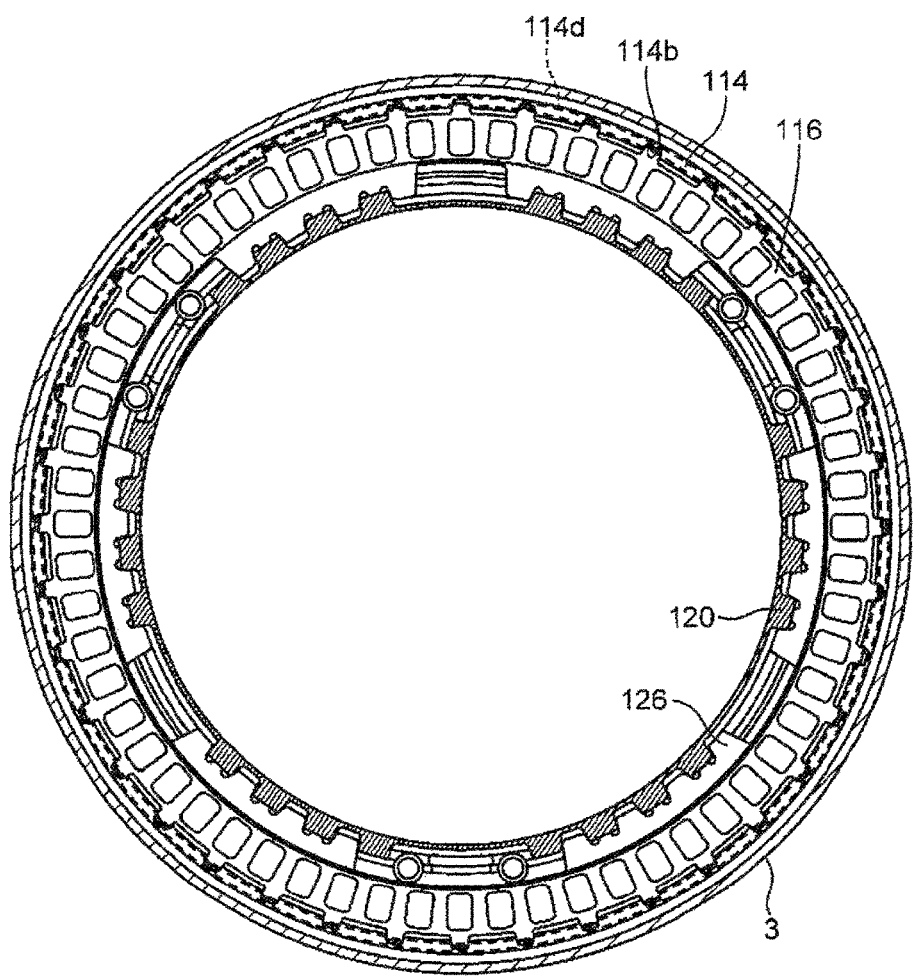
FIG. 8 is a diagram for explaining a dam member.
Figure 9:
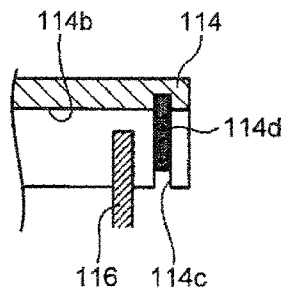
FIG. 9 is a partially enlarged view of FIG. 1.

The brake device 100 is accommodated in the transmission casing 3 having a substantially cylindrical shape. Each of FIGS. 1 to 4 is a partially enlarged view of a drawing in which a portion where the brake device 100 is accommodated is cut at a predetermined plane through which a central axis of the transmission casing 3 passes. The cutting plane is the same between FIGS. 1 and 2, but FIGS. 1 and 2 are enlarged views showing different portions of the same cutting plane. Further, the cutting plane is the same between FIGS. 3 and 4, but FIGS. 3 and 4 are enlarged views showing different portions of the same cutting plane. FIG. 5 is a sectional view taken along line V-V of FIGS. 3 and 4, and FIG. 6 is a sectional view taken along line VI-VI of FIGS. 3 and 4. FIG. 7 is a diagram obtained by removing a below-described rotary-side plate 116 from FIG. 5. FIGS. 8 and 9 are diagrams for explaining a below-described dam member 114d. It should be noted that in these drawings, elements other than major elements of the brake device 100 are omitted. The brake device 100 includes: a hub member 110; a plurality of rotary-side plates (rotary-side friction plates) 116; a fixed-side plate holding portion (fixed-side holding member) 120; a plurality of fixed-side plates (fixed-side friction plates) 126; a retaining plate (retaining member) 122; and an engagement piston (piston) 160. Among these, the rotary-side plate 116 corresponds to the above rotary-side element, and the fixed-side plate 126 corresponds to the above fixed-side element. The brake device 100 performs the engagement and disengagement of these elements.

The hub member 110 holds the rotary-side plates 116.

The hub member 110 is joined to the ring gear 14 of the first gear set 10 and the carrier 23 of the second gear set 20 and rotates in the transmission casing 3 integrally with the ring gear 14 and the carrier 23 around a rotation axis that extends in a forward/rearward direction, that is, a direction along the central axis of the transmission casing 3, and a leftward/rightward direction in FIGS. 3 to 5. As above, the forward/rearward direction herein denotes the direction along the central axis of the transmission casing 3, that is, a direction along a rotation axis of each rotary element and also denotes the leftward/rightward direction in FIGS. 1 to 4. Further, the following explanations will be made on the basis that in FIGS. 1 to 4, right corresponds to front, and left corresponds to rear.

The hub member 110 includes: an extending portion 112 extending from the vicinity of the rotation axis of the hub member 110 toward a radially outer side; and a rotary-side plate holding portion (rotary-side holding member) 114 extending forward from a radially outer end of the extending portion 112.

The extending portion 112 has a ring shape about the rotation axis of the hub member 110. The rotary-side plate holding portion 114 extends forward from the entire radially outer end of the extending portion 112. To be specific, the rotary-side plate holding portion 114 has a cylindrical shape and includes an inner peripheral surface 114a having a substantially cylindrical surface shape as shown in FIG. 5.

Rotary-side splines (rotary-side groove portions) 114b that are grooves extending in the forward/rearward direction are formed on the inner peripheral surface 114a of the rotary-side plate holding portion 114 so as to be located at a plurality of positions lined up in a circumferential direction of the inner peripheral surface 114a. In the present embodiment, as shown in FIG. 5, the rotary-side splines 114b are formed at equal intervals in the circumferential direction.

As shown in FIG. 1, etc., each of the rotary-side splines 114b extends from a position of the inner peripheral surface 114a of the rotary-side plate holding portion 114 which position is located slightly in front of the extending portion 112 to a front end of the inner peripheral surface 114a.

A dam member insertion groove 114c is formed at a front end portion of the inner peripheral surface 114a of the rotary-side plate holding portion 114 so as to extend in the circumferential direction over the entire circumference. FIG. 9 is an enlarged view of this front end portion. As shown in FIG. 9, a bottom surface of the dam member insertion groove 114c is located at the radially outer side of a bottom surface of the rotary-side spline 114b, and the dam member insertion groove 114c is deeper than the rotary-side spline 114b.

The dam member 114d is inserted into the dam member insertion groove 114c, and the dam member insertion groove 114c is closed by the dam member 114d. As shown by a broken line in FIG. 8, the dam member 114d has a ring shape and is inserted into the dam member insertion groove 114c over the entire circumference. It should be noted that FIG. 8 corresponds to FIG. 5 and shows the position of the dam member 114d. However, to clearly show the position of the dam member 114d in FIG. 8, part of diagonal lines showing the cross section are omitted.

More specifically, as shown in FIG. 9, the dam member 114d extends from the bottom surface of the dam member insertion groove 114c to a position which is located slightly at the radially outer side of a radially inner end of the inner peripheral surface 114a of the rotary-side plate holding portion 114 and is located at a radially inner side of the bottom surface of the rotary-side spline 114b. Therefore, parts of front end portions of the rotary-side splines 114b which parts each extends from the bottom surface of the rotary-side spline 114b to a predetermined position located at the radially inner side of the bottom surface are closed by the dam member 114d.

Radially outer ends of the rotary-side plates 116 are inserted into and locked to the rotary-side splines 114b so as to be located behind the dam member 114d.

As shown in FIG. 5, the rotary-side plate 116 is a ring-shaped plate member extending in the circumferential direction along the inner peripheral surface 114a of the rotary-side plate holding portion 114. A plurality of rotary-side locked protrusions 116a projecting toward the radially outer side are formed on an outer peripheral surface of the rotary-side plate 116. The rotary-side locked protrusions 116a are inserted into and locked to the rotary-side splines 114b, respectively. With this, the rotary-side plate 116 is held by the rotary-side plate holding portion 114 in such a posture as to extend from the inner peripheral surface 114a toward the radially inner side. The rotary-side locked protrusions 116a are locked to the rotary-side splines 114b so as to be slidable in the forward/rearward direction in the rotary-side splines 114b. Thus, the rotary-side plate 116 is slidingly displaceable in the forward/rearward direction.

In the present embodiment, four rotary-side plates 116 are provided. These rotary-side plates 116 are arranged in parallel with one other in the forward/rearward direction.

As shown in FIGS. 1 and 5, etc., a plurality of facings 117 are attached to a rear surface of each of the rotary-side plates 116. These facings 117 are provided at regular intervals in the circumferential direction over the entire circumference of the rotary-side plate 116.

The fixed-side plate holding portion 120 holds the fixed-side plates 126.

As shown in FIG. 5, etc., the fixed-side plate holding portion 120 has a substantially cylindrical shape about the rotation axis of the hub member 110 and includes an outer peripheral surface 120a having a substantially cylindrical surface shape about the rotation axis of the hub member 110. The fixed-side plate holding portion 120 is arranged at the radially inner side of the rotary-side plate holding portion 114, and the outer peripheral surface 120a of the fixed-side plate holding portion 120 is located at the radially inner side of the inner peripheral surface 114a of the rotary-side plate holding portion 114 to be opposed to the inner peripheral surface 114a.

Fixed-side splines (fixed-side groove portions) 121 that are grooves extending in the forward/rearward direction are formed on the outer peripheral surface 120a of the fixed-side plate holding portion 120 so as to be located at a plurality of positions lined up in the circumferential direction of the outer peripheral surface 120a. As shown in FIG. 6, etc., the fixed-side splines 121 include first fixed-side splines 121a each having a relatively large width (length in the circumferential direction) and second fixed-side splines 121b each having a relatively small width.

The first fixed-side splines 121a are provided at regular intervals in the circumferential direction. The second fixed-side splines 121b are provided between the first fixed-side splines 121a, that is, a plurality of second fixed-side splines 121b are provided between the first fixed-side splines 121a at regular intervals in the circumferential direction. In the present embodiment, six first fixed-side splines 121a are formed, and three second fixed-side spline 121b are formed between two first fixed-side splines 121a.

As shown in FIG. 1, etc., each of the fixed-side splines 121 (121a and 121b) extends from a position behind a front end of the fixed-side plate holding portion 120 to a position in front of a rear end of the fixed-side plate holding portion 120 (i.e., to a position in front of a position where the retaining plate 122 is provided as described later), and front and rear ends of the fixed-side splines 121 (121a and 121b) are closed.

Radially inner ends of the fixed-side plates 126 are insert into and locked to rear portions of the second fixed-side splines 121b.

As shown in FIG. 5, the fixed-side plate 126 is a ring-shaped plate member extending in the circumferential direction along the outer peripheral surface 120a of the fixed-side plate holding portion 120. A plurality of fixed-side locked protrusions 126a projecting toward the radially outer side are formed on an inner peripheral surface of the fixed-side plate 126. The fixed-side locked protrusions 126a are inserted into and locked to the second rotary-side splines 114b, respectively. With this, the fixed-side plate 126 is held by the fixed-side plate holding portion 120 in such a posture as to extend from the outer peripheral surface 120a toward the radially outer side. The fixed-side locked protrusions 126a are locked to the second rotary-side splines 114b so as to be slidable in the forward/rearward direction in the second rotary-side splines 114b. Thus, the rotary-side plate 116 is slidingly displaceable in the forward/rearward direction.

In the present embodiment, the fixed-side locked protrusions 126a are provided so as to correspond to the second fixed-side splines 121b, and the second fixed-side splines 121b are closed by the fixed-side locked protrusions 126a, respectively. Further, some of the first fixed-side splines 121a are open toward the radially outer side over the entirety in the forward/rearward direction. Specifically, as described below, springs 170 are arranged at some of the first fixed-side splines 121a (see FIG. 4), and a second flange portion 160c of the engagement piston 160 extends at the radially outer side of some of the first fixed-side splines 121a (see FIG. 2). Thus, openings of these first fixed-side splines 121a are closed. However, the other first fixed-side splines 121a are not closed but open toward the radially outer side over the entirety in the forward/rearward direction (see FIG. 3).

The fixed-side plates 126 are arranged parallel to the rotary-side plates 116 in the forward/rearward direction so as to be opposed to the rotary-side plates 116 in the forward/rearward direction. In the present embodiment, the rotary-side plates 116 and the fixed-side plates 126 are arranged in this order from the rear side.

The fixed-side plate holding portion 120 is coupled to an inside of the transmission casing 3 so as not to rotate relative to the transmission casing 3. In the present embodiment, the fixed-side plate holding portion 120 is fixed to the transmission casing 3 through a communicating member 124 extending from an inner peripheral surface of the transmission casing 3 toward the radially inner side.

The communicating member 124 extends along the inner peripheral surface of the transmission casing 3 over the entire circumference. The communicating member 124 couples the inner peripheral surface of the transmission casing 3 to a front portion of the outer peripheral surface 120a of the fixed-side plate holding portion 120. Specifically, a coupling portion 124a extending rearward is provided at a radially inner end of the communicating member 124. Further, a step portion that is concave toward the radially inner side is formed at a front portion of the fixed-side plate holding portion 120. The outer peripheral surface 120a of part of the fixed-side plate holding portion 120 which part is located at a front side of the step portion contacts an inner peripheral surface of the coupling portion 124a over the entire circumference, and the inner peripheral surface of the coupling portion 124a and the outer peripheral surface 120a are fixed to each other by welding. The fixed-side plates 126 are held by part of the fixed-side plate holding portion 120 which part is located at a rear side of the step portion.

It should be noted that the method of fixing the communicating member 124 and the fixed-side plate holding portion 120 is not limited to this, and this fixation may be performed by press fitting, a bolt, a snap ring, or the like.

As shown in FIG. 1, an operating oil supply passage 124d through which operating oil is supplied from an outside of the transmission casing 3 to a below-described oil-pressure chamber 160d is formed inside the communicating member 124 so as to communicate with the oil-pressure chamber 160d. The operating oil supply passage 124d communicates with a passage 3b in a piston oil pressure supply portion 3a formed at the transmission casing 3, and the operating oil supplied from the outside of the transmission casing 3 through the passage 3b is supplied to the oil-pressure chamber 160d. The operating oil supply passage 124d extends from an outer peripheral end of the communicating member 124 to a predetermined radially inner side position of the communicating member 124 and is open on a rear surface of the communicating member 124. As shown in FIG. 6, one piston oil pressure supply portion 3a is formed at a predetermined circumferential direction position of an outer peripheral surface of the transmission casing 3, and one operating oil supply passage 124d is formed at a predetermined circumferential direction position of the communicating member 124.

As shown in FIG. 3, a lubricating oil supply passage (lubricating oil introducing portion) 124e through which lubricating oil is supplied from the outside of the transmission casing 3 to the fixed-side spline 121 is formed inside the communicating member 124 so as to communicate with the fixed-side spline 121. The lubricating oil supply passage 124e communicates with a passage 3d in a lubricating oil supply portion 3c formed at the transmission casing 3, and the lubricating oil supplied from the outside of the transmission casing 3 through the passage 3d is supplied to the fixed-side spline 121. The lubricating oil supply passage 124e penetrates the communicating member 124 in a radial direction and communicates with the fixed-side spline 121 through an opening portion formed at the inner peripheral surface of the coupling portion 124a of the communicating member 124. As shown in FIG. 6, one lubricating oil supply portion 3c is formed at a predetermined circumferential direction position of the outer peripheral surface of the transmission casing 3, and one lubricating oil supply passage 124e is formed at a predetermined circumferential direction position of the communicating member 124.

In the present embodiment, the lubricating oil supply passage 124e communicates with the fixed-side spline 121 (part of the first fixed-side splines 121a) which is not closed by the fixed-side locked protrusion 126a, the spring 170, or the like as described above and is open toward the radially outer side over the entirety in the forward/rearward direction. As shown in FIG. 6, one lubricating oil supply passage 124e is formed at a predetermined circumferential direction position of the communicating member 124.

It should be noted that the transmission casing 3 and the communicating member 124 may be formed integrally. To be specific, the transmission casing 3 may be provided with, for example, a vertical wall extending from the inner peripheral surface of the transmission casing 3 toward the radially inner side, and the fixed-side plate holding portion 120 may be fixed to the vertical wall. In this case, the lubricating oil supply passage 124e may be formed at the vertical wall.

The retaining plate 122 sandwiches the rotary-side plates 116 and the fixed-side plates 126 together with the engagement piston 160.

The retaining plate 122 is arranged behind the rotary-side plates 116 and the fixed-side plates 126 so as to be opposed to the rotary-side plates 116 and the fixed-side plates 126. To be specific, in the present embodiment, the retaining plate 122 is arranged behind and opposed to the rotary-side plate 116 which is arranged at a rearmost side. The retaining plate 122 extends toward the radially outer side from a rear end of the fixed-side plate holding portion 120 over the entire circumference. Specifically, the retaining plate 122 extends from the fixed-side plate holding portion 120 to a position located slightly at the radially inner side of the inner peripheral surface of the rotary-side plate holding portion 114. The retaining plate 122 configured as above extends in parallel with the extending portion 112 of the hub member 110 so as to be located in front of and spaced apart from the extending portion 112. Thus, a gap is defined between the retaining plate 122 and the extending portion 112. In the present embodiment, the retaining plate 122 and the fixed-side plate holding portion 120 are formed integrally.

The engagement piston 160 is accommodated between the communicating member 124 and the group of the plates 116 and 126 (the fixed-side plate 126 located at a frontmost side) and presses the plates 116 and 126 against the retaining plate 122. The engagement piston 160 extends along the communicating member 124 over the entire circumference.

The engagement piston 160 includes: a swelling portion 160a provided at a radially intermediate position of the engagement piston 160 and swelling rearward; a first flange portion 160b provided at a radially outer side end portion of the engagement piston 160 and extending toward the radially outer side; and the second flange portion 160c provided at a radially inner side end portion of the engagement piston 160 and extending in the forward/rearward direction.

As shown in FIG. 2, part of the second flange portion 160c of the engagement piston 160 which part corresponds to part of the first fixed-side spline 121a extends through the plates 116 and 126 to a position in front of the retaining plate 122 and closes part of the first fixed-side spline 121a. It should be noted that a distance between the second flange portion 160c and the retaining plate 122 is set such that when the engagement piston 160 is displaced to press the plates 116 and 126, the second flange portion 160c and the retaining plate 122 do not contact each other.

Further, as shown in FIG. 4, the spring 170 is provided between part of the second flange portion 160c of the engagement piston 160 and the retaining plate 122, and the engagement piston 160 is biased forward by the spring 170. In the present embodiment, as shown in FIGS. 4 and 5, the springs 170 are arranged at some of the first fixed-side splines 121a (in the example of FIG. 5, three first fixed-side splines 121a lined up at regular intervals in the circumferential direction). Thus, some of the first fixed-side splines 121a are closed by the springs 170.

The oil-pressure chamber 160d which is supplied with and stores the operating oil is defined between the engagement piston 160 and the communicating member 124.

When the operating oil is supplied through the operating oil supply passage 124d to the oil-pressure chamber 160d, and oil pressure of the operating oil becomes a predetermined value or more, the engagement piston 160 moves toward the plates 116 and 126, that is, rearward against biasing force of the springs 170 and presses the plates 116 and 126 against the retaining plate 122 to engage the plates 116 and 126. When the oil pressure decreases, the engagement piston 160 returns forward by the biasing force of the springs 170 to disengage the plates 116 and 126.

As above, the brake device 100 changes the engaged states of the plates 116 and 126 in accordance with the oil pressure supplied to the oil-pressure chamber 160d.

The oil pressure supplied to the brake device 100, such as the oil pressure supplied to the oil-pressure chamber 160d, is changed by a control valve unit provided, for example, under the transmission casing 3. Further, the control valve unit changes the oil pressure based on a command from a controller configured to control various devices provided in a vehicle.

(3) Control of Lubricating Oil and Flow Route of Lubricating Oil

Next, the control of the lubricating oil and the flow route of the lubricating oil in the present embodiment will be explained in reference to FIG. 3, etc. Arrows in FIG. 3 show the flow of the lubricating oil.

Before and after the engagement of the brake device 100, the brake device 100 is subjected to slip control. To be specific, after the rotary-side plates 116 and the fixed-side plates 126 become a slip state, they are engaged. Further, after the rotary-side plates 116 and the fixed-side plates 126 are switched from the engaged state to the slip state, they are completely disengaged. In the present embodiment, the brake device 100 is subjected to the slip control when starting the vehicle, so that the number of times of the slip control performed is large.

When the controller outputs a command for subjecting the brake device 100 to the slip control, the control valve unit supplies the lubricating oil through the lubricating oil supply portion 3c to the lubricating oil supply passage 124e formed in the operating oil supply passage 124d. The lubricating oil flows through the lubricating oil supply passage 124e to be introduced to the first fixed-side spline 121a where the springs 170 are not provided. As described above, the front end of the first fixed-side spline 121a is not open forward. Therefore, the lubricating oil moves rearward in the first fixed-side spline 121a. Further, as described above, the first fixed-side spline 121a is not closed by the fixed-side plates 126 and extends through the radially inner side of the fixed-side plates 126 and rotary-side plates 116 to the retaining plate 122. Therefore, the lubricating oil moves in the first fixed-side spline 121a to the vicinity of the retaining plate 122. Thus, regarding the forward/rearward direction, the lubricating oil reaches an entire region where the plates 116 and 126 are arranged.

The lubricating oil moves toward the radially outer side by centrifugal force of the rotary-side plates 116 to flow into gaps among the plates 116 and 126. At this time, the lubricating oil exists at the entire region where the plates 116 and 126 are arranged, so that the lubricating oil substantially equally flows into the respective gaps among the plates 116 and 126.

The retaining plate 122 is arranged behind and opposed to the rotary-side plate 116 arranged at the rearmost side, and the engagement piston 160 is arranged in front of the fixed-side plate 126 arranged at the frontmost side. Therefore, the lubricating oil stays in a space between the retaining plate 122 and the engagement piston 160, that is, stays in the region where the plates 116 and 126 are arranged, and is prevented from scattering from this region in the forward/rearward direction. Therefore, the plates 116 and 126 are effectively lubricated and cooled by the lubricating oil.

As above, in the present embodiment, the communicating member 124, the lubricating oil supply passage 124e, and the first fixed-side spline 121a serve as a lubricating oil supply portion configured to supply the lubricating oil to the plates 116 and 126. It should be noted that in a case where the transmission casing 3 is provided with, for example, a vertical wall extending from the inner peripheral surface of the transmission casing 3 toward the radially inner side instead of the communicating member 124, and the lubricating oil supply passage 124e is formed at the vertical wall, the vertical wall, the lubricating oil supply passage 124e, and the first fixed-side spline 121a serve as the lubricating oil supply portion.

The lubricating oil having flowed through the gaps among the plates 116 and 126 moves to the inner peripheral surface 114a of the rotary-side plate holding portion 114, and part of the lubricating oil flows into the rotary-side splines 114b. As described above, although the rotary-side splines 114b are open forward, front ends of the rotary-side splines 114b are closed by the dam member 114d. Further, the rotary-side splines 114b are not open rearward. Therefore, the lubricating oil stays in the rotary-side splines 114b, and the rotary-side plates 116 are further cooled by the lubricating oil.

As above, in the present embodiment, during slipping, the lubricating oil is more surely supplied to and stays in the gaps among the plates 116 and 126. With this, the plates 116 and 126 can be properly lubricated and cooled and can be prevented from becoming high in temperature.

When the controller outputs a command for terminating the slip control of the brake device 100 for the purpose of completely engaging the brake device 100 or completely disengaging the brake device 100, the control valve unit stops the supply of the lubricating oil to the lubricating oil supply passage 124e.

If the lubricating oil remains in the gaps among the plates 116 and 126 when the brake device 100 is completely disengaged, the lubricating oil causes drag resistance among the rotary-side plates 116 and the fixed-side plates 126, and this may deteriorate the fuel efficiency.

However, in the present embodiment, as described above, after the lubricating oil flows through the gaps among the plates 116 and 126, the lubricating oil moves to the inner peripheral surface 114a of the rotary-side plate holding portion 114. At this time, the rotary-side plate holding portion 114 is rotating. Therefore, by the centrifugal force of the rotary-side plate holding portion 114, the lubricating oil do not stay at the inner peripheral surface 114a of the rotary-side plate holding portion 114 or the gaps among the plates 116 and 126 for a long period of time but quickly scatters to positions away from the inner peripheral surface 114a and the gaps. Specifically, the lubricating oil scatters to the front side of the plates 116 and 126 or scatters to the rear side of the plates 116 and 126 to flow through the gap between the retaining plate 122 and the extending portion 112 to the outside of the brake device 100.

As above, in the present embodiment, when the supply of the lubricating oil is stopped, the lubricating oil is prevented from staying at the gaps among the plates 116 and 126 for a long period of time. Thus, it is possible to prevent a case where the drag resistance among the plates 116 and 126 is caused by the staying of the lubricating oil.

As above, according to the brake device 100 of the present embodiment, while effectively lubricating and cooling the plates 116 and 126, the drag resistance and rotational resistance generated among the plates 116 and 126 can be reduced, and the fuel efficiency can be improved.

(5) Modified Example

The above embodiment has explained a case where the communicating member 124, the lubricating oil supply passage 124e, and the first fixed-side spline 121a serve as the lubricating oil supply portion configured to supply the lubricating oil to the plates 116 and 126. However, the specific configuration of the lubricating oil supply portion configured to supply the lubricating oil to the plates 116 and 126 is not limited to this.

Further, the dam member 114d may be omitted. However, in a case where the dam member 114d is provided, the lubricating oil can be accumulated around the plates 116 and 126 at the time of the supply of the lubricating oil. Thus, the plates 116 and 126 can be more surely lubricated and cooled.

Further, Embodiment 1 has explained a case where: the outer peripheral surface 120a of the fixed-side plate holding portion 120 is provided with the first fixed-side splines 121a into each of which an inner peripheral end 126a of the fixed-side plate 126 is not inserted; and the lubricating oil is supplied to the first fixed-side spline 121a. However, the outer peripheral surface 120a of the fixed-side plate holding portion 120 may be provided with only splines into each of which the inner peripheral end 126a of the fixed-side plate 126 is inserted, and the lubricating oil may be supplied to those splines. However, in a case where the first fixed-side spline 121a that is open toward the radially outer side over the entirety in the forward/rearward direction is provided as described above, and the lubricating oil is supplied to the first fixed-side spline 121a, the lubricating oil can be more surely supplied to the entire plates 116 and 126, and the plates 116 and 126 can be effectively lubricated and cooled.

Further, Embodiment 1 has explained a case where only the engagement piston 160 is provided as a piston. However, an adjustment piston may be provided in addition to the engagement piston 160. A brake device 200 according to Embodiment 2 including an engagement piston and an adjustment piston will be explained in reference to FIGS. 10 and 11. Before the rotary-side plates 116 and the fixed-side plates 126 are engaged, the adjustment piston reduces clearances each of which is a distance between the rotary-side plate 116 and the fixed-side plate 126 in the forward/rearward direction. In Embodiment 2, the same reference signs are used for the same components as in Embodiment 1, and detailed explanations thereof are omitted.

Figure 10:
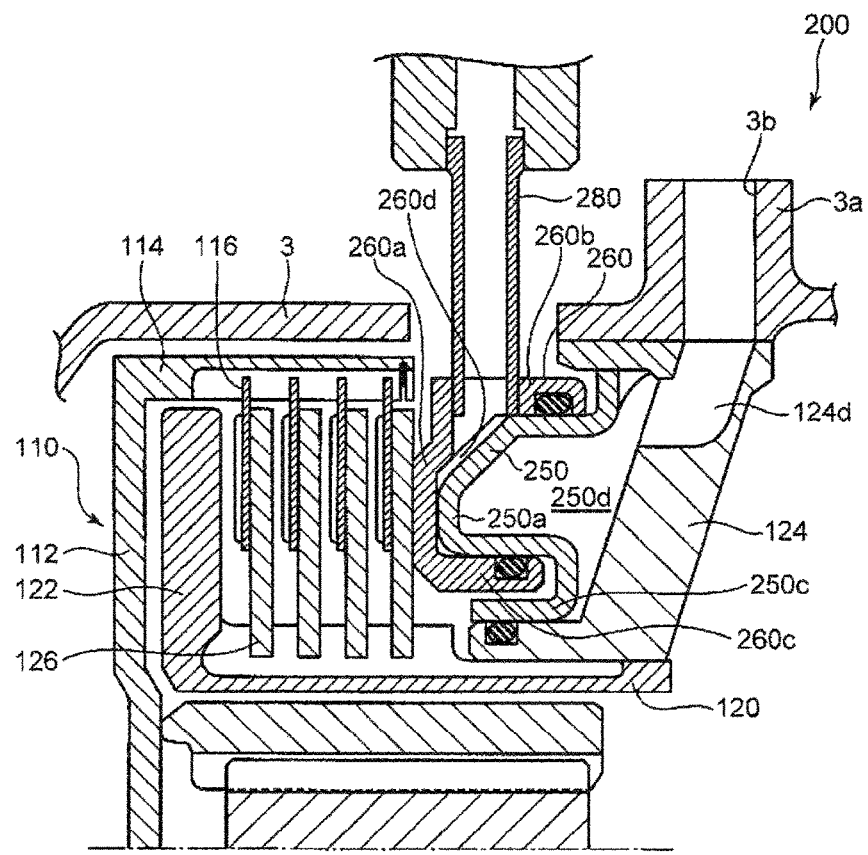
FIG. 10 is a partially enlarged view of a sectional view of the brake device according to Embodiment 2 of the present invention.

As shown in FIG. 10, in Embodiment 2, an engagement piston 260 and an adjustment piston 250 are arranged between the communicating member 124 and the fixed-side plate 126 provided at the frontmost side.

The adjustment piston 250 is substantially the same in configuration as the engagement piston 160 of Embodiment 1. The adjustment piston 250 includes: a swelling portion 250a coupled to the communicating member 124 and swelling rearward; and a second flange portion 250c provided at a radially inner side end portion of the adjustment piston 250 and extending in the forward/rearward direction. Further, as with the engagement piston 160 of Embodiment 1, part of the second flange portion 250c extends to a position in front of the retaining plate 122, and the spring 170 is provided between part of the second flange portion 250c and the retaining plate 122. An oil-pressure chamber 250d communicating with the operating oil supply passage 124d is defined between the engagement piston 160 and the communicating member 124. However, in Embodiment 2, a distance between the retaining plate 122 and part of the second flange portion 250c which part is located in front of the retaining plate 122 is set such that when the adjustment piston 250 is displaced rearward, the retaining plate 122 and the second flange portion 250c contact each other.

In Embodiment 2, the engagement piston 260 includes a swelling portion 260a that swells rearward as with Embodiment 1. The engagement piston 260 is coupled to the adjustment piston 250 such that the swelling portion 260a covers the swelling portion 250a of the adjustment piston 250 from the rear side. Specifically, the engagement piston 260 includes: a first flange portion 260b provided at a radially outer end of the engagement piston 260 and extending in the forward/rearward direction; and a second flange portion 260c provided at a radially inner end of the engagement piston 260 and extending in the forward/rearward direction. These flange portions 260b and 260c are coupled to the adjustment piston 250 through sealing members.

Figure 11:
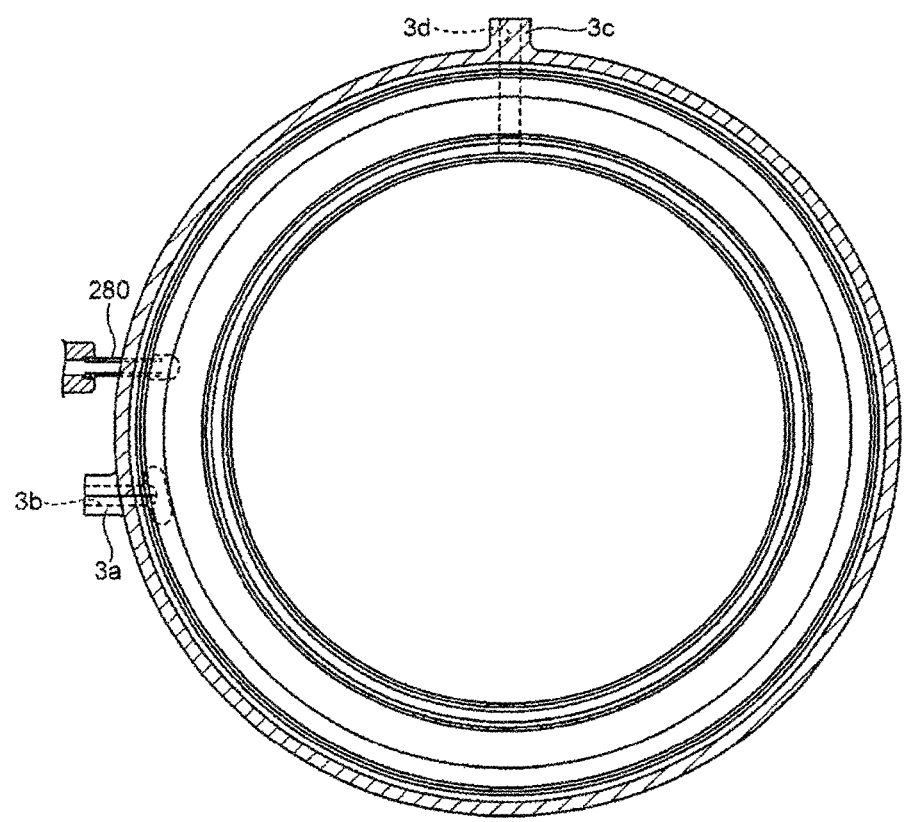
FIG. 11 is a cross-sectional view of the brake device according to Embodiment 2 of the present invention.

In Embodiment 2, a second oil-pressure chamber 260d which is supplied with and stores the operating oil is defined between the engagement piston 260 and the adjustment piston 250. A second piston oil pressure supply portion 280 extending to the outside of the transmission casing 3 is connected to the first flange portion 260b. Specifically, the second piston oil pressure supply portion 280 is a tubular member and is connected to the first flange portion 260b through a rubber seal (not shown) such that the engagement piston 260 can move in the forward/rearward direction. A passage communicating with the second oil-pressure chamber 260d is formed inside the second piston oil pressure supply portion 280. The operating oil is supplied from the outside of the transmission casing 3 through the passage to the second oil-pressure chamber 260d. As shown in FIG. 11, one second piston oil pressure supply portion 280 is arranged at a predetermined circumferential direction position of the outer peripheral surface of the transmission casing 3.

In Embodiment 2, when the controller outputs a command for engaging the brake device 100, the control valve unit first supplies predetermined oil pressure to the oil-pressure chamber 250d through the piston oil pressure supply portion 3a. When the oil pressure is supplied, the adjustment piston 250 moves rearward, that is, moves toward the plates 116 and 126 against the biasing force of the springs 170. Further, the engagement piston 260 is pushed by the adjustment piston 250 to move toward the plates 116 and 126, and the plates 116 and 126 are pushed rearward by the engagement piston 260. Thus, intervals among the plates 116 and 126 and an interval between the retaining plate 122 and the rotary-side plate 116 arranged at the rearmost side are reduced. The rearward movements of the adjustment piston 250 and the engagement piston 260 are stopped by the contact of the second flange portion 250c with the retaining plate 122. With this, the plates 116 and 126 move to such positions that each of the intervals becomes an extremely small value, for example, a total of all the intervals is 1 mm.

Next, the control valve unit supplies predetermined oil pressure to the second oil-pressure chamber 260d through the second piston oil pressure supply portion 280. The engagement piston 260 receives the supply of the oil pressure to press the plates 116 and 126 against the retaining plate 122. Thus, the fixed-side plates 126 and the rotary-side plates 116 are engaged.

In Embodiment 2, as described above, each of the intervals among the plates 116 and 126 is preset to an extremely small value close to zero by the adjustment piston 250.

Therefore, the plates 116 and 126 can be quickly engaged by the supply of the oil pressure to the second oil-pressure chamber 260d.

LIST OF REFERENCE CHARACTERS 1 automatic transmission (transmission)
3 transmission casing
100 brake device
112 extending portion
114 rotary-side plate holding portion (rotary-side holding member)
114b rotary-side spline (rotary-side groove portion)
114d dam member
116 rotary-side plate (rotary-side friction plate)
120 fixed-side plate holding portion (fixed-side holding member)
121 fixed-side spline (fixed-side groove portion)
122 retaining plate (retaining member)
124 communicating member
124e lubricating oil supply passage (lubricating oil introducing portion)
126 fixed-side plate (fixed-side friction plate)
160 engagement piston (piston)

The invention claimed is:
1. A brake device accommodated in a transmission casing, the brake device comprising:
a rotary-side friction plate coupled to a predetermined rotary element;
a rotary-side holding member configured to hold the rotary-side friction plate and be rotatable;
a fixed-side friction plate arranged so as to be opposed to the rotary-side friction plate in a forward/rearward direction and configured to be engaged with and disengaged from the rotary-side friction plate;
a fixed-side holding member configured to hold the fixed-side friction plate and not to rotate;
a lubricating oil supply portion configured to supply lubricating oil to the fixed-side friction plate and the rotary-side friction plate;
a retaining member arranged so as to be opposed to the friction plates;
a piston configured to push the friction plates toward the retaining member; and
an operating oil supply passage extending from an inner peripheral surface of the transmission casing to a predetermined position located at a radially inner side of the transmission casing, operating oil being supplied through the operating oil supply passage to an oil-pressure chamber of the piston, wherein:
the rotary-side holding member includes an inner peripheral surface located at a radially outer side of the fixed-side holding member;
the rotary-side friction plate is attached to the inner peripheral surface of the rotary-side holding member;
the lubricating oil supply portion includes a lubricating oil introducing portion which extends radially inward from the inner peripheral surface of the transmission casing toward an outer peripheral surface of the fixed-side holding member, and introduces the lubricating oil to the fixed-side holding member from outside of the transmission casing; and
the lubricating oil introducing portion is located at a different position from the operating oil supply passage in a circumferential direction of the transmission casing and is located at a same position as the operating oil supply passage in an axial direction of the transmission casing.

2. The brake device according to claim 1 wherein:
the retaining member extends toward the radially outer side from a portion of the fixed-side holding member, the portion being located at a rear side of the friction plates; and
the piston is provided in front of the friction plates.

3. The brake device according to claim 2, wherein the rotary-side holding member includes a rotary-side groove portion which is a groove formed on the inner peripheral surface of the rotary-side holding member to extend in the forward/rearward direction and into which a radially outer end of the rotary-side friction plate is inserted,
the brake device further comprising:
an extending portion extending toward a radially inner side from a portion of the rotary-side holding member, the portion being located at a rear side of the rotary-side groove portion; and
a dam member provided at a front end of a portion of the rotary-side holding member, the rotary-side groove portion being formed at the portion, the dam member being configured to close at least part of the rotary-side groove portion.

4. The brake device according to claim 3, wherein:
the fixed-side holding member includes a plurality of fixed-side groove portions formed at a plurality of respective circumferential direction positions on the outer peripheral surface of the fixed-side holding member and extending in the forward/rearward direction;
a radially inner end of the fixed-side friction plate is inserted into part of the plurality of fixed-side groove portions;
at least part of the remaining fixed-side groove portions is open toward the radially outer side over the forward/rearward direction; and
the lubricating oil supply portion supplies the lubricating oil to the open fixed-side groove portion.

5. The brake device according to claim 2, wherein:
the fixed-side holding member includes a plurality of fixed-side groove portions formed at a plurality of respective circumferential direction positions on the outer peripheral surface of the fixed-side holding member and extending in the forward/rearward direction;
a radially inner end of the fixed-side friction plate is inserted into part of the plurality of fixed-side groove portions;
at least part of the remaining fixed-side groove portions is open toward the radially outer side over the forward/rearward direction; and
the lubricating oil supply portion supplies the lubricating oil to the open fixed-side groove portion.

6. The brake device according to claim 1, wherein the rotary-side holding member includes a rotary-side groove portion which is a groove formed on the inner peripheral surface of the rotary-side holding member to extend in the forward/rearward direction and into which a radially outer end of the rotary-side friction plate is inserted,
the brake device further comprising:
an extending portion extending toward a radially inner side from a portion of the rotary-side holding member, the portion being located at a rear side of the rotary-side groove portion; and
a dam member provided at a front end of a portion of the rotary-side holding member, the rotary-side groove portion being formed at the portion, the dam member being configured to close at least part of the rotary-side groove portion.

7. The brake device according to claim 6, wherein:
the fixed-side holding member includes a plurality of fixed-side groove portions formed at a plurality of respective circumferential direction positions on the outer peripheral surface of the fixed-side holding member and extending in the forward/rearward direction;
a radially inner end of the fixed-side friction plate is inserted into part of the plurality of fixed-side groove portions;
at least part of the remaining fixed-side groove portions is open toward the radially outer side over the forward/rearward direction; and
the lubricating oil supply portion supplies the lubricating oil to the open fixed-side groove portion.

8. The brake device according to claim 1, wherein:
the fixed-side holding member includes a plurality of fixed-side groove portions formed at a plurality of respective circumferential direction positions on the outer peripheral surface of the fixed-side holding member and extending in the forward/rearward direction;
a radially inner end of the fixed-side friction plate is inserted into part of the plurality of fixed-side groove portions;
at least part of the remaining fixed-side groove portions is open toward the radially outer side over the forward/rearward direction; and
the lubricating oil supply portion supplies the lubricating oil to the open fixed-side groove portion.

9. The brake device according to claim 1, further comprising a communicating member extending from the inner peripheral surface of the transmission casing toward the radially inner side over the entire inner peripheral surface of the transmission casing, wherein
the lubricating oil introducing portion and the operating oil supply passage are formed at the communicating member.

* * * * *